(12) United States Patent
Mori

(10) Patent No.: US 7,671,726 B2
(45) Date of Patent: Mar. 2, 2010

(54) APPARATUS FOR IMPROVING RECEPTION IN A WHEEL MONITORING SYSTEM AND MANUFACTURING THE SAME

(75) Inventor: Masashi Mori, Oobu (JP)

(73) Assignee: DENSO CORPORATION, Kariya (JP)

( * ) Notice: Subject to any disclaimer, the term of this patent is extended or adjusted under 35 U.S.C. 154(b) by 287 days.

(21) Appl. No.: 11/896,741

(22) Filed: Sep. 5, 2007

(65) Prior Publication Data

US 2008/0055063 A1 Mar. 6, 2008

(30) Foreign Application Priority Data

Sep. 5, 2006 (JP) ............... 2006-240269

(51) Int. Cl.
*B60C 23/00* (2006.01)
(52) U.S. Cl. ............... 340/447; 340/442; 73/146.5
(58) Field of Classification Search ......... 340/442–448; 73/146–146.8
See application file for complete search history.

(56) References Cited

U.S. PATENT DOCUMENTS 5,602,524 A 2/1997 Mock et al.
6,362,731 B1 * 3/2002 Lill ...................... 340/445
7,315,240 B2 * 1/2008 Watabe ................. 340/447
7,498,931 B2 * 3/2009 Kovac et al. .......... 340/442
2007/0008097 A1 1/2007 Mori et al.

FOREIGN PATENT DOCUMENTS

| JP | 3212311 | 8/1995 |
| JP | 2005-335654 | 12/2005 |
| JP | 2007-15491 | 1/2007 |

\* cited by examiner

*Primary Examiner*—Jeffery Hofsass
(74) *Attorney, Agent, or Firm*—Nixon & Vanderhye, PC

(57) ABSTRACT

A wheel position detecting apparatus comprises transmitters, a triggering device, and a receiver. The transmitters are attached to the plurality of wheels respectively. Each transmitter transmits a frame responsively to a triggering signal from the triggering device. The frame includes data indicating a reception intensity of the triggering signal. The triggering device is disposed in a vehicle body and outputs the triggering signal toward the transmitters attached to the plurality of wheels. This triggering device is positioned nearest to a specified wheel among the plurality of wheels to which the triggering signal is outputted, the specified wheel being influenced most heavily by noise generated in the vehicle. The receiver, disposed to the vehicle body, receives the frame and uses the data indicating the reception intensity of the triggering signal to detect positions of the wheels by determining which transmitter is attached to which wheel.

16 Claims, 6 Drawing Sheets

APPARATUS FOR IMPROVING RECEPTION IN A WHEEL MONITORING SYSTEM AND MANUFACTURING THE SAME

CROSS REFERENCES TO RELATED APPLICATION

The present application relates to and incorporates by reference Japanese Patent application No. 2006-240269 filed on Sep. 5, 2006.

BACKGROUND OF THE INVENTION

1. Field of the Invention

The present invention relates to an apparatus for detecting a state the wheels are attached to which positions of a vehicle and a method of manufacturing the detecting apparatus.

2. Description of the Related Art

Conventionally, a direct type of apparatus for detecting the inflation pressure of tires of a vehicle has been known. In this type of tire inflation pressure detecting apparatus, there is provided a transmitter with a sensor such as a pressure sensor, which is directly attached to a wheel with a tire. On the side of the vehicle body, an antenna and a receiver are provided. Thus, when the receiver receives, via the antenna, from the transmitter a detection signal detected by the sensor, the receiver is able to detect the inflation pressure of each tire on the received detection signal.

In this direct type of tire inflation pressure detecting apparatus, it is determined whether or not data which has been received is coming from the transmitter of the own vehicle and it is determined by the transmitter that the detection signal is coming from which sensor. For those determinations, as shown in U.S. Pat. No. 5,602,524 (which corresponds to Japanese Patent No. 3212311), data to be transmitted from the transmitter additionally contains ID (identification) information to distinguish the own vehicle from other vehicles and identify a wheel with the transmitter. The ID information is previously stored in the receiver and, when the receiver receives data from the transmitter, the stored ID information and received ID information are used to determine that which wheel the data is coming from.

However, in cases where the user changes the positions of the wheels in, for example, rotating tires, there occurs a problem. That is, the user should read ID information about rotated tires, and update already stored information by the read-out ID information in the receiver. Unless such an information update work is done, the tire inflation pressure detecting apparatus cannot cope with the positional changes of the wheels.

The registration of the ID information in the receiver is a time-consuming task, and thus it is desired to detect the locations of the transmitters (or the associated tires), in other words, to automatically identify the wheel on which each of the transmitters (or the associated tires) is located, even if there is noise in the vehicle.

SUMMARY OF THE INVENTION

The present invention has been made in view of the above-mentioned problem, and has an object of providing a wheel identifying on-vehicle apparatus and a tire inflation pressure detecting on-vehicle apparatus, which apparatuses are able to automatically and accurately identify, or each of the transmitters, the location of each wheel without manual handling ID information given to each wheel, even if there is noise in the vehicle.

In order to achieve the above object, there is provided an apparatus for detecting positions of a plurality of wheels of a vehicle, comprising: transmitters attached respectively to the plurality of wheels, each of the transmitters comprising a receiving antenna, a transmitting antenna, a receiving unit receiving a triggering signal via the receiving antenna, a first processing unit receiving the triggering signal received by the receiving unit, calculating a reception intensity of the triggering signal, and storing data indicative of the reception intensity into a frame to be transmitted, and a transmitting unit transmitting the frame processed by the first processing unit via the transmitting antenna; a triggering device disposed in a body of the vehicle and formed to output the triggering signal toward the transmitters attached to the plurality of wheels, the triggering device being positioned nearest to a specified wheel among the plurality of wheels to which the triggering signal is outputted, the specified wheel being influenced most heavily by noise generated in the vehicle; and a receiver disposed to the body and formed to comprise a receiving unit receiving the frame transmitted from the transmitters and a second processing unit processing the received frame to read out the data indicative of the reception intensity from the frame and use the read-out data to detect the positions of the wheels by determining which transmitter is attached to which wheel.

In consideration of the influence of noise, the position of the body, within which the triggering device is disposed, is decided. Therefore, it is possible for the transmitters to receive the triggering signal from the triggering device in a steadier and more reliable manner. This enables the positions of wheels to be reliably detected. Therefore, each of the transmitters, i.e., the location of each wheel can be identified automatically and accurately without manual handling ID information given to each wheel even if there is noise in the vehicle.

The structures of the foregoing wheel position detecting apparatus can be implemented in an apparatus for detecting inflation pressure of tires provided at a plurality of wheels of a vehicle. This inflation pressure detecting apparatus can also enjoy the similar advantages to the above explained about the wheel position detecting apparatus.

DETAILED DESCRIPTION OF THE PREFERRED EMBODIMENTS

Figure 1:
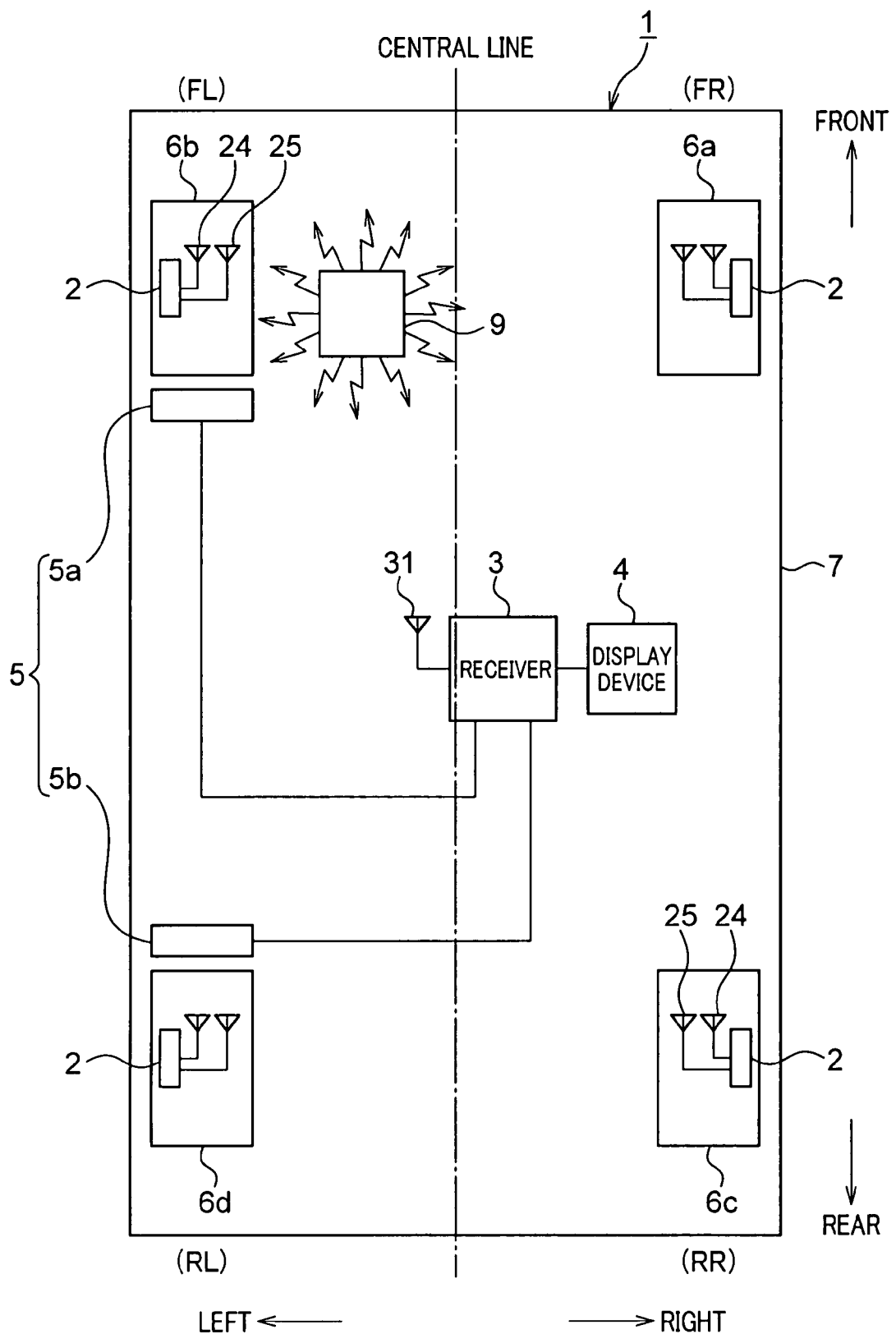
FIG. 1 is a scheme outlining the overall structure of a tire inflation pressure detecting apparatus in which a wheel position detecting apparatus according to an embodiment of the present invention is functionally implemented.

Hereinafter, referring to the accompanying drawings, various embodiments of the present invention will now be described. In the following embodiments, the same or similar components are given the same reference numerals for the sake of a simplified description.

First Embodiment

Referring to FIGS. 1-6, a first embodiment will now be described.

FIG. 1 shows the overall configuration of a tire inflation pressure detecting apparatus to which the wheel position detecting apparatus according the first embodiment of the present invention is functionally applied.

The tire inflation pressure detecting apparatus is installed to a vehicle 1 and configured to detect the inflation pressure of four tires each of which is fitted on one of four wheels 6a-6d of the vehicle 1 (i.e., the front right (FR) wheel 6a, the front left (FL) wheel 6b, the rear right (RR) wheel 6c, and the rear left (RL) wheel 6d) or one of five wheels including a spare tire.

As shown in FIG. 1, the tire inflation pressure detecting apparatus, which is or is to be mounted on a vehicle 1, includes four transceivers 2, a receiver 3, a display device 4, and triggering devices 5. In the present embodiment, the transceivers 2, receiver 3, and triggering devices 5 compose the wheel position detecting apparatus according to the present invention.

Each of the transceivers 2 is mounted on one of the four wheels 6a-6d (or the five wheels including the spare tire), so as to have association with the tire on the one of the wheels 6a-6d. Each transceiver 2 works to sense the inflation pressure of the associated tire and transmit a frame of data that contains tire pressure information indicative of the sensed inflation pressure of the associated tire.

On the other hand, the receiver 3 is mounted on the body 7 of the vehicle 1. The receiver 3 works to receive all the frames of data transmitted by the transceivers 2 and determine the inflation pressure of each of the four tires based on the tire pressure information contained in the received frames of data.

Figure 2:
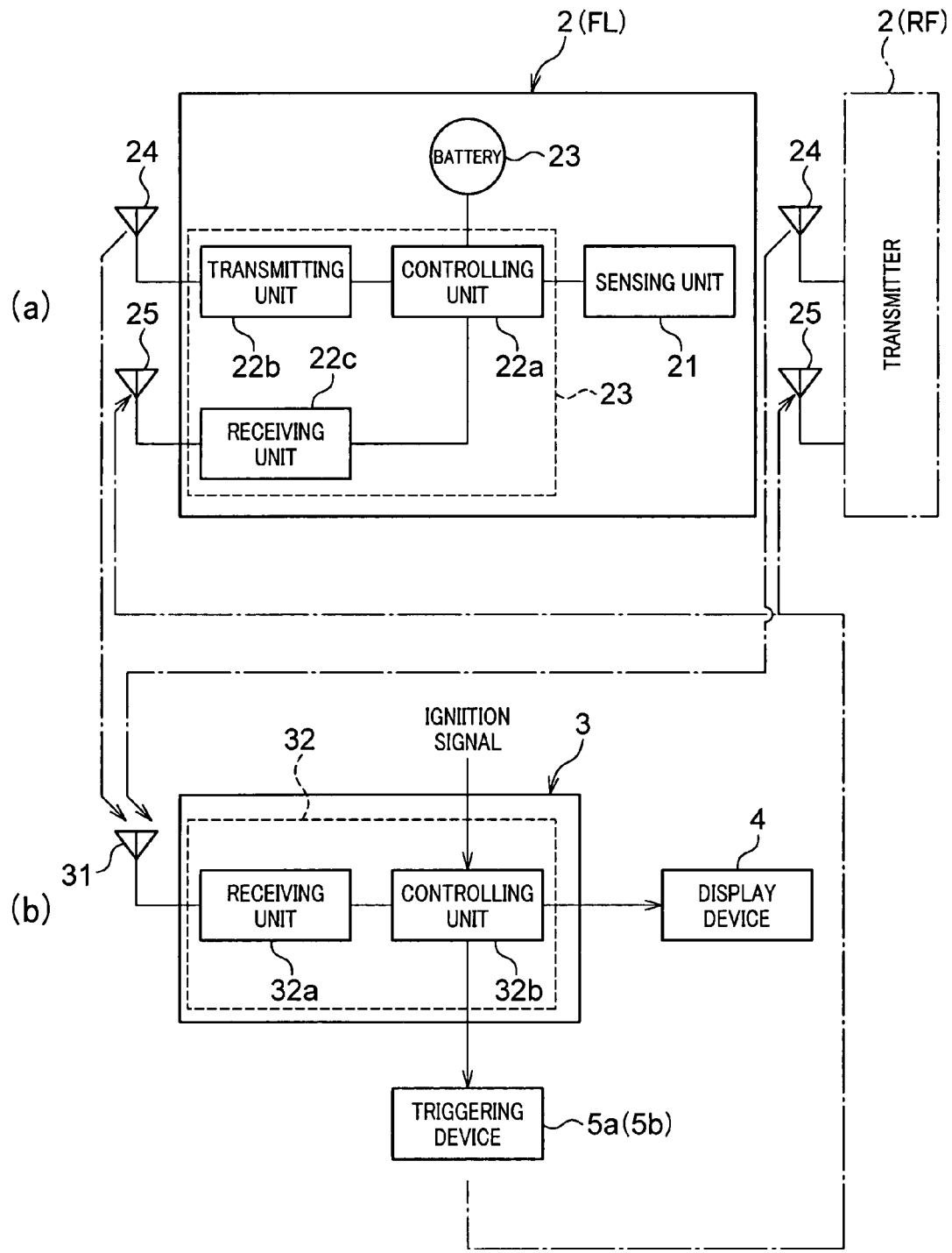
FIG. 2 is a block diagram showing transmitters, a receiver and a triggering device included in the tire inflation pressure detecting apparatus.

FIG. 2 shows in block forms the configurations of each of the transceivers 2 and the receiver 3, respectively. As shown in FIG. 2(a), each transceiver 2 is configured with a sensing unit 21, a microcomputer 22, a battery 23, a transmitting antenna 24, and a receiving antenna 25.

The sensing unit 21 is configured with sensors, such as a diaphragm-type pressure sensor and a temperature sensor, and works to output signals representative of the sensed inflation pressure of the tire and the sensed temperature of air in the tire.

The microcomputer 22 is of a well-known type and functionally includes a controlling unit 22a, a transmitting unit 22b, and a receiving unit 22c. The microcomputer 22 is configured to implement predetermined processes in accordance with a program installed in a memory (not shown) of the controlling unit 22a.

The controlling unit 22a works to receive the signals indicative of the inflation pressure coming from the sensing unit 21 and process those signals. The controlling unit 22a also works to assemble the frame of data, which contains first data indicative of the detected inflation pressure of each tire and second data indicative of ID (identification) information of each transceiver 2, and provide the frame of data to the transmitting unit 22b. Hereinafter, the first data, which is indicative of the detected inflation pressure of each tire, is referred to as "data relating to the tire inflation pressure." The program stored in the not-shown memory of the controlling unit 22a allows the frame of data to be provided at intervals from the controlling unit 22a to the transmitting unit 22b.

The controlling unit 22a works to receive, via the receiving antenna 25 and the receiving unit 22c, a triggering signal transmitted by the triggering devices 5 and determine the strength (i.e., intensity or amplitude) of the received triggering signal through given signal processing thereof. The controlling unit 22a also works to store, in the frame data in which the data relating to the tire inflation pressure is already stored or another frame of data, signal strength data indicative of the determined strength of the triggering signal in a given format. The controlling unit 22a then provides the frame of data to the transmitting unit 22b. The processing for providing the frame of data to the transmitting unit 22b is also under the control of the program stored in the not-shown memory of the controlling unit 22a and executed at intervals.

Additionally, the controlling unit 22a is formed to control time instants (i.e., timing) at which the frames of data is provided to the transmitting unit 22b. This timing control is for avoiding the data transmitted from the respective transmitters 2 interfering or butting with each other. For example, transmission timing, which is set to a time instant coming after the reception of a triggering signal and is for starting transmission of a frame of data, is set differently from each other among the transmitters 2. Thus the transmitters 2 at the respective wheels 6a-6d are able to transmit frames of data at mutually different timings.

However, the above transmission at mutually different timings cannot be achieved by simply memorizing different transmission timings into the respective controlling unit 22a of the respective transmitters 2. That is, such a simple memorization results in different memorized contents in the respective transmitters 2. Hence, depending on the reception strength of a triggering signal to be received, it is required to shift the transmission timings at which frames of data is started to be transmitted. This shift in the transmission timings is realized by for example using a map or calculating. In the case of using the map, the map is formed to allow proper transmission timings to be selected in accordance with the reception strength of the triggering signal. In the case of calculation, the controlling unit 22a memorizes therein a function formula for transmission timing, which involves, as a variable, transmission strengths of a triggering signal, and calculation is made to automatically shift the transmission timings amount the respective transmitters 2 depending on differences in the reception strengths of the respective triggering signals. By using this way of setting the transmission timings, it is possible to use the same program in the controlling unit 22a of all the transmitters 2.

In addition, the program memorized in the controlling unit 22a can be set such that the transmission timing at each transmitter 2 is changed at random every transmission. This random changing allows a higher probability of different transmission timings between the respective transmitters.

The transmitting unit 22b serves as an output member to transmit, through the transmission antenna 24, toward the receiver 3, the frame of data coming from the controlling unit 22a with the use of RF-range electromagnetic waves of for example 310 MHz.

Meanwhile, the receiving unit 22c is an input member to receive a triggering signal via the reception antenna 25, and give the received triggering signal to the controlling unit 22a.

The battery 23 is placed to power the controlling unit 22a and other units. Hence, thanks to the power from battery 23, the units are able to achieve their assigned functions. Thus the controlling unit 22a is able to perform acquisition of data relating to the tire inflation pressure from the sensing unit 21 as well as various types of calculation.

Each of the transmitters 2, constructed above, is for example attached to an air injection valve of each of the wheels 6a-6d in such a way that its sensing unit 21 is located and exposed inside the wire. By this arrangement, the tire inflation pressure of each wheel is detected as a signal indicating the pressure at sampling intervals (for instance, every one minute), whereby the detection signal is transmitted, via the transmission antenna, from each transmitter 2 to the receiver 3 every sampling interval.

As shown in FIG. 2(*b*), the receiver 3 is configured with a receiving antenna 31 and a microcomputer 32.

The receiving antenna 31 is fixed to the body 7 of the vehicle 1 to receive, as illustrated in FIG. 1, all the frames of data transmitted by the respective transceivers 2.

The microcomputer 32 is of a well-known type and functionally includes a receiving unit 32a and a controlling unit 32b. The microcomputer 32 is configured to implement predetermined processes, based on the signals contained in the frames of data transmitted from the transceivers 2, in accordance with a program installed in a memory (not shown) of the controlling unit 32b.

The receiving unit 32a works to receive, via the receiving antenna 31, all the frames of data transmitted by the respective transceivers 2 and provide the received frames of data to the controlling unit 32b.

The controlling unit 32b works to output a command signal to the triggering devices 5 for causing the triggering devices 5 to transmit the triggering signals. In addition, the controlling unit 32b works to accept the frames of data from the receiving unit 32a, and then reads out the reception strength data of the triggering signal at each transmitter 2 contained in each frame of data. Based on the reception strength data of the triggering signal, the controlling unit 32b identifies, for each of the frames of data received from the receiving unit 32a, of the four wheels 6a-6d, the wheel on which each transceiver 2 having transmitted the frame of data is mounted.

In addition, the controlling unit 32b works to calculate a tire inflation pressure of each wheel 6a (to 6d) through various types of signal processing and calculation on the basis of the data stored in the received frames of data, and then output to the display device 4 electrical signals corresponding to the calculated tire inflation pressures. Thus, both the inflation pressure and location of each of the four tires can be determined by the controlling unit 32b.

By way of example, the controlling unit 32b uses a predetermined threshold Th to make a comparison between the threshold Th and the calculated tire inflation pressure. In this processing, when the determined inflation pressure of any of the four tires is decreased to below the predetermined threshold Th, the controlling unit 32b outputs to the display device 4 a warning signal indicative of both the decreased inflation pressure and location of the tire.

The display device 4 is, as illustrated in FIG. 1, electrically connected to the receiver 3 and arranged in a location visible for the driver of the vehicle 1. The display device 4 is configured with, for example, a warning display on the instrument panel of the vehicle 1. The display device 4 works to inform, in response to receipt of the warning signal from the receiver 3, the driver of both the decreased inflation pressure and the locations of the tires.

The triggering devices 5 are formed to respond to a triggering command signal coming from the controlling unit 32b in the receiver 3. In reply to this triggering signal, the triggering devices 5 operate to output triggering signals having a frequency of for example 134 kHz belonging to an LF band and having a predetermine signal strength (amplitude).

In the present embodiment, the triggering device 5 are composed of two triggering devices which consists of a first triggering device 5a disposed on the front wheel side and a second triggering device 5b disposed on the rear wheel side. The reason why the two triggering devices 5a and 5b are disposed is that the law limits the upper strength of available electromagnetic waves, so that use of only one triggering signal is confronted with a difficulty in that some of the transmitters 2 may not be able to or are not able to receive the electronic magnetic wave. To cope with this concern, the present embodiment employs the two triggering devices 5a and 5b, in which the first triggering device 5a is in charge of surely transmitting the triggering signal to the front right and left wheels 6a and 6b, whilst the second triggering devices 5b is in charge of surely transmitting the triggering signal to the rear right and left wheels 6c and 6d.

In the present embodiment, there is an additional feature concerning the disposal of each of the first and second triggering devices 5a and 5b. That is, each of the first and second triggering devices 5a and 5b is offset in their disposal with respect to a central line equally dividing the body of the vehicle 1 in the right-and-left direction thereof. Practically, the first triggering device 5a is disposed nearer to the front left wheel 6b on the left side of the body, but its disposal position is more distant from the front right wheel 6a than the left one. The same is true of the second triggering device 5b. That is, this device 5b is disposed nearer to the rear left wheel 6d on the left side of the body, but its disposal position is more distant from the rear right wheel 6c than the left one.

The reason for such an offset dispose is based on an assumption that there is a nose source 9 in the vehicle 1 and the noise source 9 generates noise possibly affecting the triggering signals from the first and second triggering devices 5a and 5b. And in the present embodiment, the noise source 9 is assumed to be for example an engine located near to the left-side wheels 6b and 6d. While taking this into consideration, the first and second triggering devices 5a and 5b are disposed in the vicinity of the left-side wheels 6b and 6d, respectively, which are nearer to the noise source 9 than the rights-side wheels 6a and 6c. Thus, the distance from the first triggering device 5a to the front right wheel 6a is longer than that from the first triggering device 5a to the front left wheel 6b. Similarly, the distance from the second triggering device 5b to the rear right wheel 6c is longer than that from the second triggering device 5b to the rear left wheel 6d.

In addition, it is preferable for the triggering devices 5a and 5b to be arranged in such a location that no metal member covers each of the triggering devices 5a and 5b and it is possible to protect the triggering devices 5a and 5b from foreign matters, such water and a stone, during running of the vehicle 1.

In this way, the tire inflation pressure detecting apparatus is configured, in which the wheel position detecting apparatus is also functionally reduced in practice.

How to decide the disposal positions of the first and second triggering devices 5a and 5b in the foregoing tire inflation pressure detecting apparatus will now be described.

Figure 3:
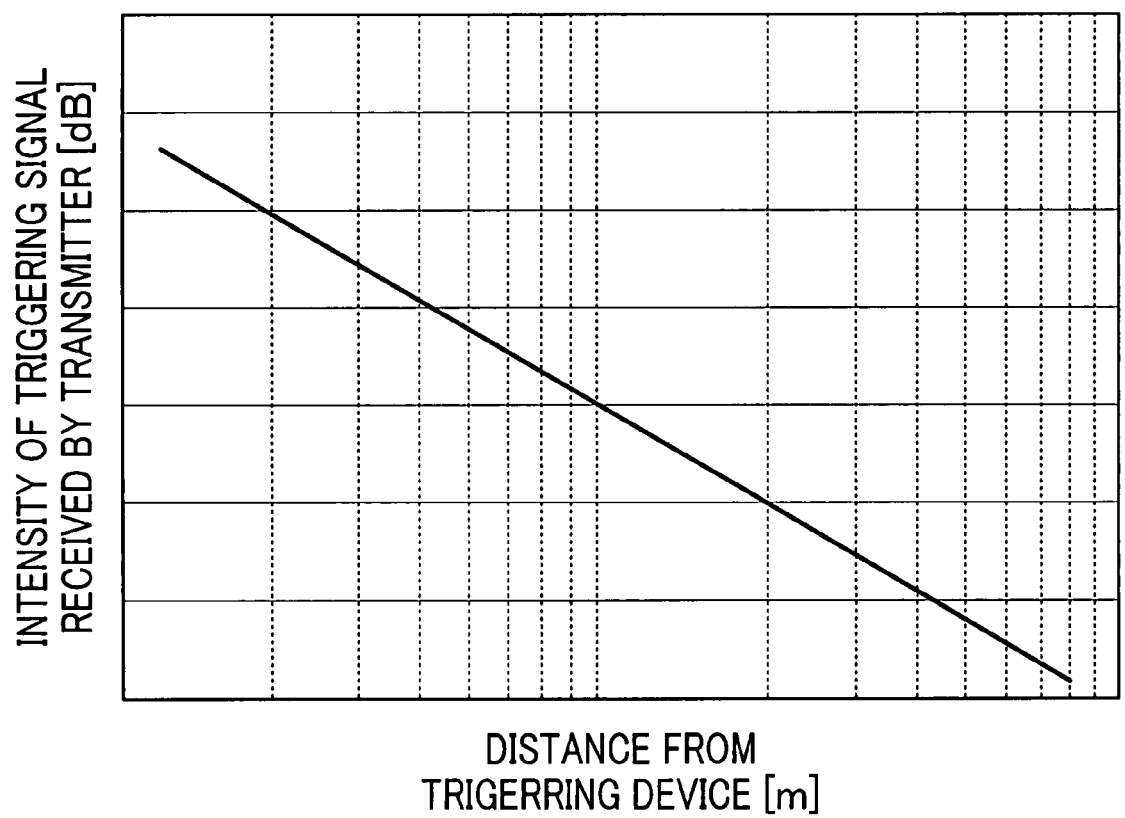
FIG. 3 is a graph showing a relationship between distances from the triggering device to the transmitters and intensities of a triggering signal to be received by the transmitters.

FIG. 3 is a graph showing a relationship between the distance from each triggering device 5a (5b) to each transmitter 2 and the reception strength of a triggering signal received by each transmitter 2. In the free space, the reception strength of the triggering signal (i.e., the electric field strength of electromagnetic waves) will decay depending on distances from the triaging device 5a (5b). Hence, as shown in FIG. 3, the strength of the triggering signal received by the transmitter 2 is apt to decrease as the distance from the triggering device 5a (5b) to each transmitter 2 is made longer.

Thus, in order to enable each transmitter 2 to receive the triggering signal, it should be taken into account that a margin of difference between erroneous noise and the triggering signal can be easily discerned in order to reliably receive the signal. Namely, it is absolutely required that the level of strength of the triggering signal be greater than that of the noise so as to have a difference larger than the margin between the triggering signal and the noise.

Figure 4A:
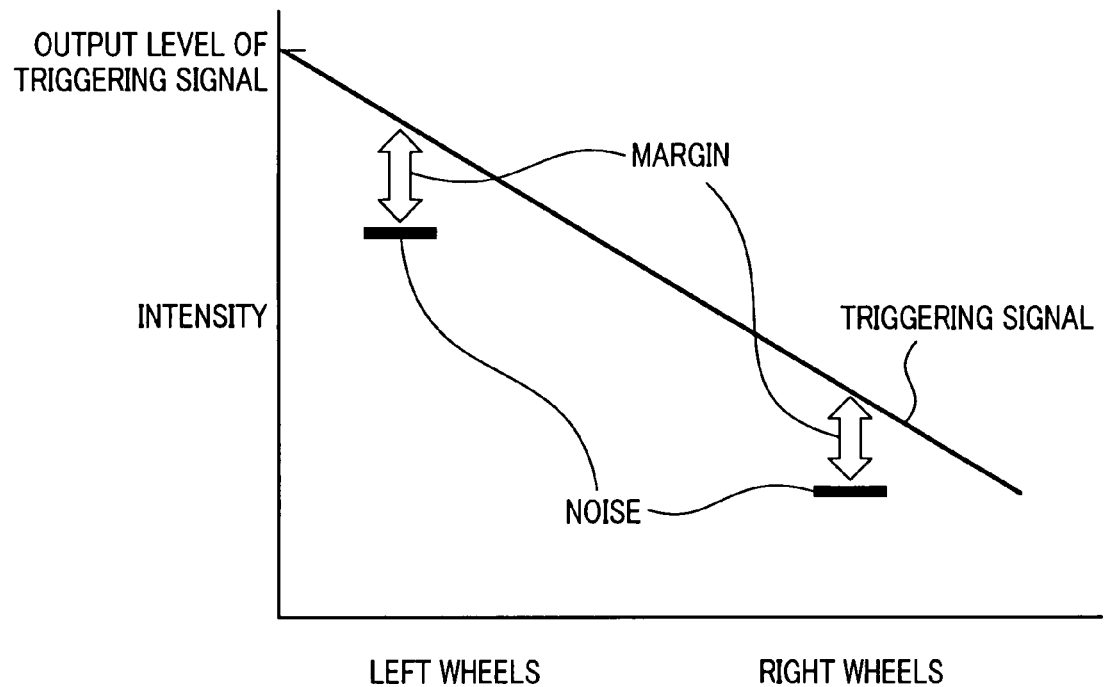
FIG. 4A is a graph showing a relationship among distances from the triggering device to each transmitter, intensities of the triggering signal, and levels of noise, which relationship is established in a case where the triggering device is disposed on the vehicle left-wheel side.
Figure 4B:
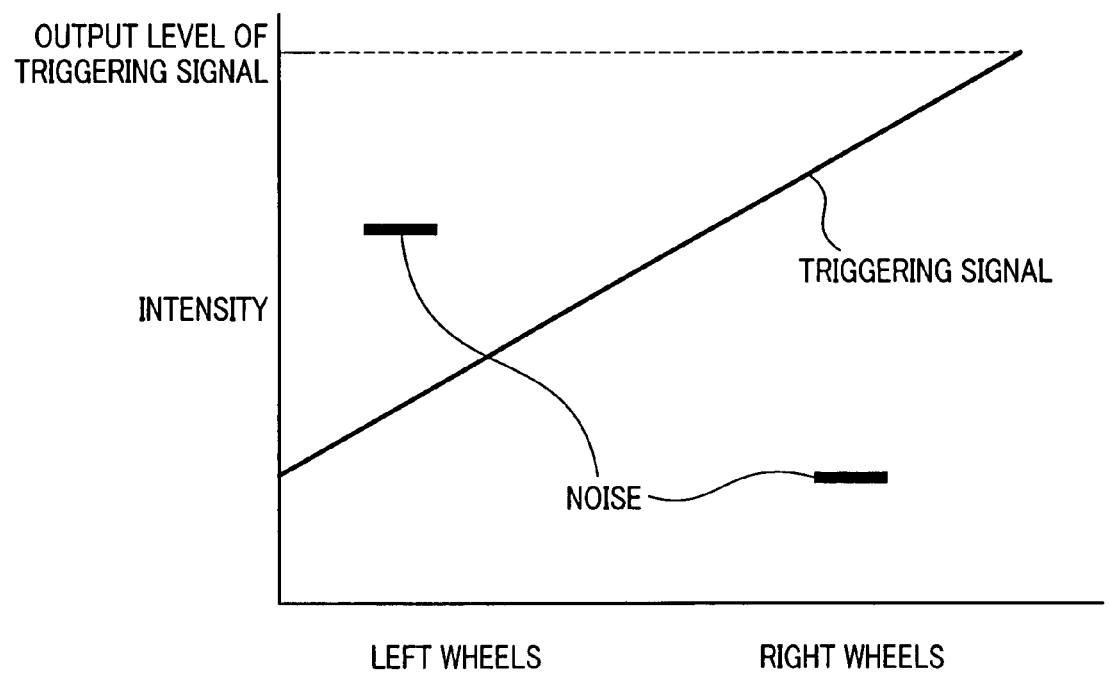
FIG. 4B is a graph showing a relationship among distances from the triggering device to each transmitter, intensities of the triggering signal, and levels of noise, which relationship is established in a case where the triggering device is disposed on the vehicle right-wheel side.

Apart from the above general principle, as illustrated in FIG. 1, when the noise source 9 is located nearer to the front left wheel 6b, situations are made more complicated. In this case, disposing the triggering devices 5a and 5b on the left-wheel side (6b and 6d) gives a relationship between the levels of strengths of both the triggering signal and the noise, which relationship is shown in FIG. 4A. In contrast, disposing the triggering devices 5a and 5b on the right-wheel side (6a and 6c) gives a relationship between the levels of strengths of both the triggering signal and the noise, which relationship is shown in FIG. 4B. Incidentally, the level of noise from the noise source 9 changes, because this noise level also depends on the distance from the noise source 9.

As understood from FIG. 4A showing the disposal of the triggering devices 5a and 5b on the left-wheel side, the level of strength of the trigger signal is higher than that of the noise at both the right wheel positions (6a and 6c) and the left wheel positions (6b and 6d). Thus it is possible that, even when the noise source 9 is active so as to generate noise, all the transmitters 2 disposed at the four wheels 6a-6d cannot be overcome by the noise and can receive each triggering signal in a good electromagnetic wave condition.

By contrast, as shown in FIG. 4B, in the case where the triggering devices 5a and 5b are disposed on the right-wheel side (6a and 6c), the noise strength level is kept higher than the level of strength of the trigger signal at the positions of the right-side wheels 6a and 6c. But this is not true of the left-side wheels. That is, the noise strength level is lower than the level of strength of the trigger signal at the positions of the left-side wheels 6b and 6d. Accordingly, under the condition in which the noise is generated from the noise source 9, there is a fear that the transmitters 2 disposed at the lefts-side wheels 6b and 6d cannot receive the triggering signal.

In considering the above reasons, the apparatus according to the present embodiment is designed such that the first and second triggering devices 5a and 5b are disposed near to the front and rear left-side wheels, respectively. This offset disposal of each of the triggering devices 5a and 5b makes it possible that all the transmitters 2 attached to the four wheels 6a-6d receive the triggering signals, respectively.

Figure 5:
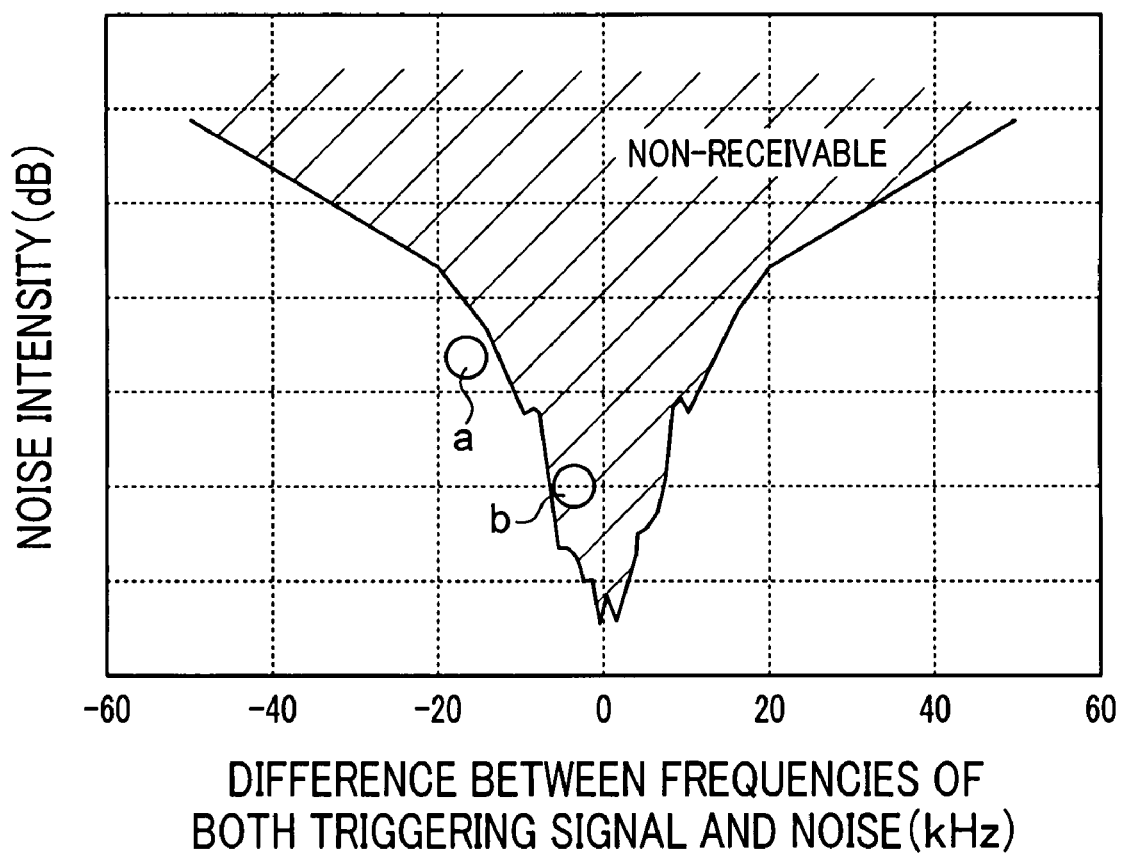
FIG. 5 is a graph showing a characteristic showing a receivable region and a non-receivable region in a map made on both a difference between frequencies of the triggering signal and the noise and noise intensities.

By the way, there is another technical factor which should be considered in determining whether or not the noise from the noise source 9 will affect the safe reception of the triggering signal at the transmitters 2, other than the relationship between the signal levels. Such a factor is a relationship between the frequencies of both the triggering signals and the noise. FIG. 5 is a characteristic showing a relationship between differences between each triggering signal and noise frequencies and noise strengths, so that the graph shown in FIG. 5 provides a frequency region assuring the reception of the triggering signal at each transmitter 2 and another frequency region not assuring the reception of the triggering signal at the respective transmitters 2. The frequency of each triggering signal is for example 134 kHz.

As shown in FIG. 5, the smaller the difference of frequencies between the triggering signal and the noise, the more difficult the reception of the triggering signals, even though the volume of the noise is not so high. Meanwhile, as the difference of frequencies between the triggering signal and the noise becomes larger, it becomes easier for the respective transmitters 2 to receive the triggering signal, even if the noise strength becomes higher. In particular, in a range of frequency-differences within ±10 kHz, the noise has a large influence of the safe reception of the triggering signal, which means that it is highly probable that the transmitters 2 cannot receive each trigger signal, even if there is noise with lesser strengths.

Hence, in addition to the power of the noise, it is required that the noise source 9 be specified as a source generating noise that influences the safe reception of each triggering signal by each receiver 2, by considering the characteristic shown in FIG. 5. Practically, as shown in FIG. 5, if a part "a" generating larger-strength noise is located on the right-wheel side (6a and 6c), it is assumed, from consideration of the noise frequency, that the part "a" is not a crucial noise source to affect the safe reception of the triggering signals at the respective receives 2, even if the noise strength is larger. In such a case, as shown by a part (b) in FIG. 5, the part "b" is specified as a noise source 9, as long as the noise frequency is close to the frequency of the triggering signals and has an influence on the safe reception of each triggering signal at each receiver 2, even if the noise strength is smaller than that of the part "a." Accordingly, the triggering devices 5a and 5b are disposed to wheels which are closer to the part "b."

Such a determining step specifying (or determining or designating) the noise source 9 can be done prior to a mounting step in which the triggering devices 5a and 5b are mounted to the vehicle 1, which mounting step is included in a step for manufacturing the tire inflation pressure detecting apparatus. Alternatively, the specifying step may be done as a step for simulating every type of vehicle noise or may be done as a step for examining noise of each vehicle. Through such steps, a part that generates noise affecting the safe reception of a triggering signal by each receiver 2 is specified as the noise source 9. Specified results are reflected in the mounting step for the triggering devices 5a and 5b, in which, as described before, if it is found that the noise source 9 is located nearer to the left-side wheels 6b and 6d, the triggering devices 5a and 5b are disposed nearer to the left-side wheels 6b and 6d than the right-side wheels 6a and 6c, respectively. In the present embodiment, the foregoing mounting step is included in the manufacture of the tire inflation pressure detecting apparatus.

In this way, when the disposal positions of the triggering devices 5a and 5b are decided depending on the position of the noise source, the triggering signals emanating from the triggering machines 5a and 5b can be received by the respective transmitters 2 attached to the wheels 6a-6d, respectively.

In addition, the distances from each of the triggering devices, 5a (5b), to the right and left wheels 6a and 6b (6c and 6d). Practically, in the present embodiment, the distance from the first triggering device 5a to the right wheel 6a is longer than that to the left wheel 6b, the triggering signal received by the transmitter 2 at the right wheel 6a becomes lower than that received by the transmitter 2 at the left wheel 6b. As a result, comparison between the strengths of both triggering signals reveals that each transmitter 2 is attached to which one of the front right wheel 6a and the front left wheel 6b. In a similar way to the above, the strengths of reception of the second triggering signal 5b can be compared to each other to determine which rear wheel, wheel 6c or 6d, each transmitter 2 is attached to.

The operations of the tire inflation pressure detecting apparatus according to the present embodiment will now be described.

This tire inflation pressure detecting apparatus starts wheel position detection in response to a switchover of the not-shown ignition switch from its off state to its on state. The processing for this wheel position detection is executed by the controlling unit 32b of the receiver 3.

Figure 6:
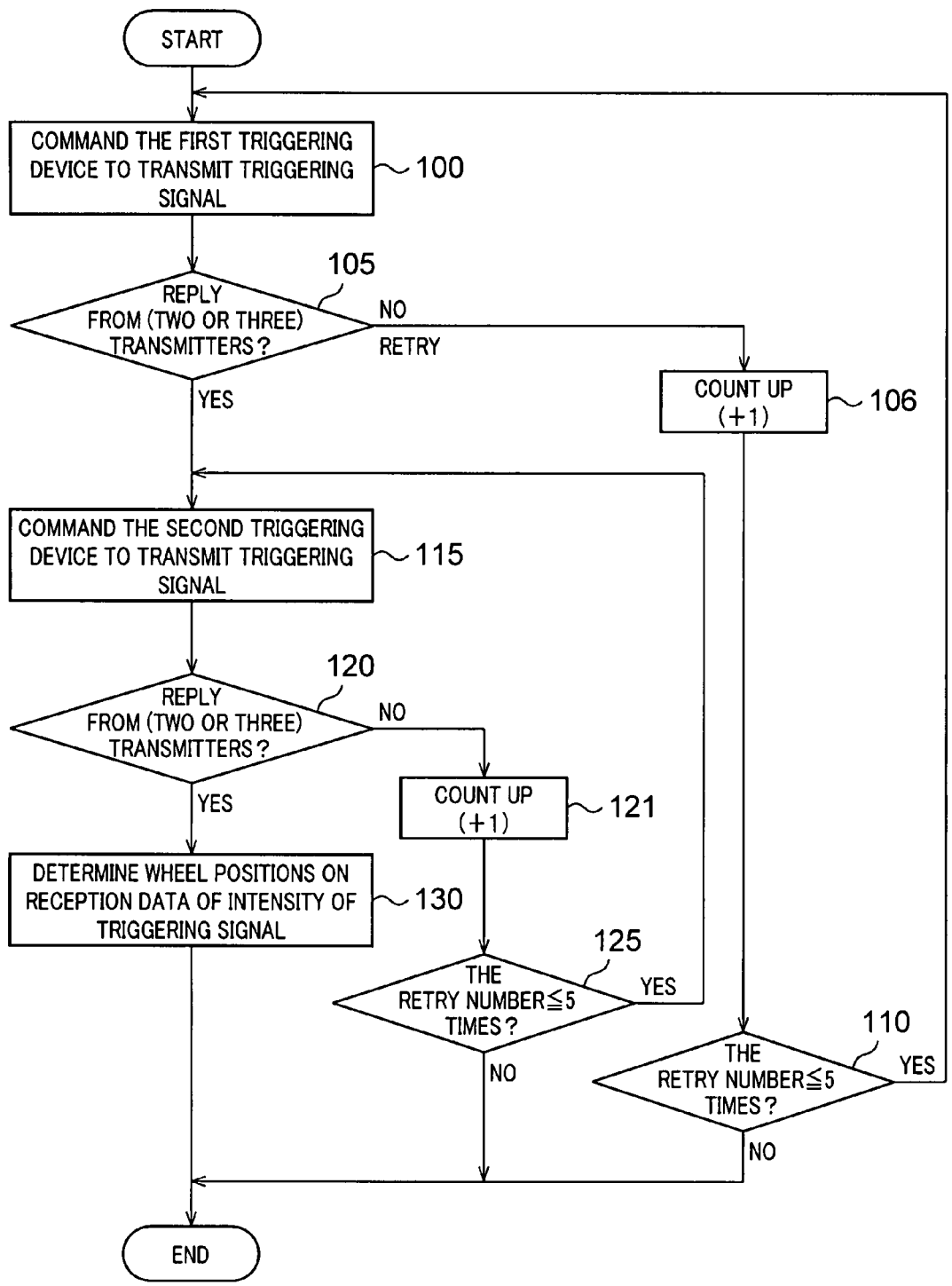
FIG. 6 is a flowchart showing wheel-position detection processing executed by a controlling unit of the receiver.

FIG. 6 is a flowchart for the wheel-position detecting processing executed by the controlling unit 32b of the receiver 3. This processing is also activated by switching on the ignition switch to power the controlling unit 32b.

At step 100 in FIG. 6, the controlling unit 32b outputs a triggering command signal to the first triggering device 5a when a predetermined period of time has elapsed from the power-on operation. In response to the input of the triggering command signal to the first triggering device 5a, the triggering device 5a outputs a triggering signal having a predetermined signal level toward the transmitters 2 attached to the front right and left wheels 6a and 6b via the antenna 31.

The triggering signal is transmitted and inputted to the controlling unit 22a via the receiving antenna 25 and receiving unit 22c, which are arranged to and in each of the front right and left wheels 6a and 6b. This input of the triggering signal to the controlling unit 22a allows the controlling unit 22a to be awaken (i.e., Wake-up state), and then the strength of the received triggering signal is detected (i.e., measured) by each receiver 2 on the front wheel side.

After detection of the reception strength of each triggering signal, each transmitter 2 stores, into a frame of data, data indicating the detected reception strength as well as ID (identification) information to distinguish each transmitter 2 from the others, and then transmits the frame of data to the receiver 3. In this situation, the transmission timings, at which the respective transmitters 2 attached to the frontal wheels, start transmitting the frame of data are made different to each other. As a result, it is possible that the frames of data sent from each transmitter 2 to be received by the receiver 3 without mutual interference.

Then the processing is shifted to step 105, where it is determined whether or not all the predetermined-number transmitters 2 at the front two wheels has replied to the triggering signal from the first triggering device 5a. The "predetermined number" is for example 2 or 3, depending on the vehicle. That is, when the transmitters 2 which are covered by the first triggering device 5a are attached to only the both front wheels 6a and 6b, the "predetermined number" is two. Alternatively, if the rear left wheel 6d is relative shorter in the distance from the first triggering device 5a and it can be designed that the transmitter 2 attached to the rear left wheel 6d is covered by the first triggering device 5a, the "predetermined number" is three. Of course, the number of transmitters 2 depends on various factors, such as the strength of the triggering signals and the distances from the first triggering device 5a to each of both the rear wheels 6c and 6d. If conditions are met, four transmitters 2 can then be used.

For example, when the vehicle 1 runs on a road surface made up of metal plates, parked on the metal-made parking lot, on parked near facilities from which disturbing waves are generated, the output strength of the triggering signals may be influenced by environments surrounding the vehicle 1. In such a case, it may be difficult for the transmitters 2 to receive the triggering signal in a stable manner. In this example, of the two transmitters 2 attached to the front wheels 6a and 6b, at least one transmitter 2 fails to receive the triggering signal, resulting in that the two transmitters 2 cannot transmit the frames of data. In this case, there is a possibility that two or more transmitters 2 cannot reply. Thus, in this case, the determination at step 105 becomes negative (NO), which is followed by step 110 to retry the foregoing steps 100 and 105. Every time the negative determination at step 105 is done, a count counted by a not-shown counter embedded in the controlling unit 32b is incremented at step 106 to remember the number of retry times.

And, at step 110, it is determined whether or not the number of retry times is five or less. If it is determined that the number of retry times is five or less, the processing is returned to step 100 for the retry, while if it is determined that the number of retry times is six, the retry is abandoned and the processing is terminated. In this case, it is estimated that the transmitter(s) is out of order or the battery is exhausted, so that the display device 4 is commanded to display a suitable message expressing the current situation.

On the other hand, in a case where it is determined at step 105 that the replies from the predetermined-number transmitters 2 are normally received, the processing is shifted to step 115, where the triggering command signal is outputted to the second triggering device 5b, like the process at step 100. Thus, as to the rear right and left wheels 6c and 6d, the processes which are the same as those at steps 100-110 are executed through steps 115-125. Hence, from the transmitters 2 attached to the rear right and left wheels 6c and 6d, data indicative of the strengths of the received triggering signals can be received by the receiver 3.

By the way, though the process at step 120 is the same as that at step 105, there is one thing which should be considered about a spare tire. In some cases, the spare tire is disposed near the rear wheels 6a and 6b, which spare tire is sometimes equipped with the transmitter 2. In cases where the spare tire is left out of count, the number of transmitters 2 of which output data should be processed is two or three, where the two transmitters 2 are for both rear wheels 6c and 6d and the three transmitters 2 are for the front left wheel 6b as well as both rear wheels 6c and 6d. However, in cases where the spare tire is counted, the number of transmitters 2 of which output data should be processed is three or four, i.e., plus one from the case with no spare tire counted. Of course, the number of transmitters changes according to the intensity of the triggering signal and the distance from the first triggering device 5a to both rear wheels 6c and 6d. It is therefore probable that the number of transmitters in this rear-wheel side processing is further increased by one, which depends on design conditions or others.

Returning to FIG. 6, at step 130, the ID information stored in each of the frames of data received at step 105 is read out, pieces of the ID information are sorted in the descending order of reception signal strengths, and determination is made such that ID information giving the higher reception intensity comes from the transmitter 2 attached to the front left wheel 6b and ID information giving the lower reception intensity comes from the transmitter 2 attached to the front right wheel 6a. Then, pieces of the ID information determined are stored (registered) in the memory of the controlling unit 32b in one-to-one correspondence to the front right and left wheels 6a and 6b to which the transmitters 2 are attached respectively.

In addition, at step 130, the ID information stored in each of the frames of data received at step 120 is read out, and then subjected to the same processing as that for the front wheels. Namely, pieces of the ID information are sorted in the descending order of reception signal strengths, and determination is made such that ID information giving the higher reception intensity comes from the transmitter 2 attached to the rear left wheel 6d and ID information giving the lower reception intensity comes from the transmitter 2 attached to the rear right wheel 6c. Then, pieces of the ID information determined are stored (registered) in the memory of the controlling unit 32b in one-to-one correspondence to the rear right and left wheels 6c and 6d to which the transmitters 2 are attached respectively, before the wheel position detecting processing is ended.

Therefore, when it is necessary for the receiver 3 to perform the tire inflation pressure detection described later, the receiver 3 receives the frames of data in which data showing the tire inflation pressure are stored. And the receiver 3 uses the ID information stored in the frames of data to decide that each transmitter 2 transmitting each frame of data is attached to which of the four wheels 6a-6d. This decision enables calculation of the tire inflation pressure of each of the wheels 6a-6d. Accordingly, as to detecting or knowing that each transmitter 2 is attached to any one of the wheels 6a-6d, it is possible for the apparatus to automatically detect such attachment conditions, thereby omitting the requirement for the user to manually read and reregister the ID information.

After the wheel position detection described above, the tire inflation pressure detecting apparatus performs the tire inflation pressure detection.

Practically, the tire inflation pressure detecting apparatus is brought into its regular transmission mode, in which as described, each transmitter 2 makes its controlling unit 22a accept detection signals showing tire inflation pressure and temperature within the tire. Those detection signals then undergo signal processing, according to need, to be transformed into data relating to the tire inflation pressure, and this data is stored, together with the ID information showing the transmitter 2, into a frame of data being transmitted. Such frames of data are transmitted to the receiver 3 via the transmitting unit 22b at intervals.

On the other hand, when the receiver 2 receives the frame of data from transmitters 2 via the antenna 31, its controlling unit 32b accepts the received frame with the aid of the receiving unit 32a. The controlling unit 32b extracts, from the received frame of data, data relating to the tire inflation pressure and data showing the temperature in the tire. According to need, the temperature-showing data is subjected to temperature correction, before being applied to calculation of the tire inflation pressure. In this calculation, the ID information of each wheel, i.e., each transmitter 2 is stored in the frame of data received. Thus, this ID information is subjected to a comparison with the ID information which was already acquired and memorized through the wheel position detection, for determining that the currently-received frame of data was transmitted from which one of the transmitters 2 attached to the four wheels 6a-6d.

And in such a case that a difference between the currently calculated tire inflation pressure and the previous one is less than a predetermined threshold, that is, changes in the tire inflation pressure is smaller, intervals at which the tire inflation pressure is detected regularly are not changed and kept at relatively longer intervals (for example, at one-minute intervals). In contrast, the tire inflation pressure largely changes over the predetermined threshold, the detecting intervals are made shorter (for example, at five-second internals).

It is also determined whether or not the cruelty calculated tire inflation pressure is blow a predetermined threshold. If this determination shows a decrease below the predetermined threshold, the controlling unit 32b provides the display device 4 with a signal indicating such a decrease and which of the four wheels 6a-6d is having such a decrease. The display device is able to notify a driver of the decrease in the tire inflation pressure and a wheel which is subjected to such a decrease.

When the ignition switch is switched off, the triggering command signal is outputted again from the controlling unit 32b of the receiver 3 to the triggering devices 5, which allows the triggering devices 5 to output the triggering signals again. When each of the triggering signals is given to the controlling unit 22a of the receivers 2 by way of the reception antenna 25 and the receiving unit 22c, each receiver 2 is switched into its sleep state, thus ending the tire inflation detection.

As described so far, in the present embodiment, the location of the noise source 9, which generates noise affecting the safe reception of the triggering signals at the receivers 2, is taken into account to design or set the disposal positions of the triggering devices 5a and 5b. It is therefore possible to allow the respective transmitters attached to the wheels 6a-6d to receive the triggering signals from the triggering devices 5a and 5b even if the noise source 9 is under generation of the noise. As a result, the positions of the wheels can be detected steadily and reliably, and the tire inflation pressure can be detected with precision.

Other Embodiments

In the foregoing embodiment, the first triggering device 5a is disposed for the front right and left paired wheels 6a and 6b to be targeted by the first triggering device 5a, while the second triggering device 5b is disposed for the rear right and left paired wheels 6c and 6d to be targeted by the second triggering device 5b. However this is not a decisive list, but many be modified into another form.

By way of example, the first triggering device 5a may be disposed for both front and rear left wheels 6b and 6d to be paired to receive a triggering signal from the first triggering device 5a. And the second triggering device 5b may be disposed for both front and rear right wheels 6a and 6c to be paired to receive a triggering signal from the second triggering device 5a. In this case, the first triggering device 5a is located nearer to any one of the front and rear left wheels 6b and 6d than the remaining one thereof and the second triggering device 5b is located nearer to any one of the front and rear right wheels 6a and 6c than the remaining one thereof. Thus the identical advantage to the foregoing with respect to the relationship between the triggering signals and the noise can be obtained.

In addition, the foregoing embodiment has been explained in a case where the present invention is reduced in practice in a four-wheel vehicle. However, application of the wheel position detecting apparatus and the tire inflation pressure detecting apparatus, both are according to the present invention, are not limited to such ways, but may find constructive use for vehicles with more than four wheels, for example with heavy trucks.

There is another modification about the triggering signal frequency. In the foregoing embodiment, the triggering signal is set to have a frequency of 134 kHz and the triggering devices 5a and 5b are located in consideration of the presence of noise whose frequencies contain the frequency of the triggering signal. The frequency of the triggering signal is not always limited to such a frequency, but may be set to other frequencies. From a viewpoint that frequency bands should be available for frequencies of the triggering signal, it is desired that the triggering devices 5*a* and 5*b* be located in consideration of a noise frequency range of 100 to 200 kHz.

Another modification concerns the identification of the noise source. In the foregoing embodiment, the noise source 9 has been identified positionally for making it easier to understand the influence of the noise. However, this is not always a definitive solution, because the noise does not always emanate from particular sources. Thus another way for disposing the first and second triggering devices 5*a* and 5*b* is that noise strength is measured inside the wheel houses to which the wheels 6*a*-6*d* are disposed, and then the first and second triggering devices 5*a* and 5*b* are placed near the wheels generating a higher intensity of the noise. Another way is that, of the first and second triggering devices 5*a* and 5*b*, one triggering device 5*a* (5*b*) is disposed near to a specified wheel generating the highest intensity of noise and the remaining one 5*b* (5*a*) is disposed near to the wheel located on the same right or left side of the vehicle body as the side on which the specified wheel is located.

There is a possibility that the triggering signal from the first triggering device 5*a* is received by not only the transmitters 2 attached to the front right and left wheels 6*a* and 6*b* but also the transmitter 2 attached to the rear left wheel 6*d*. In this case, if the distances from the first triggering device 5*a* to each of the front right wheel 6*a* and the rear left wheel 6*d* are close to each other, a difference between the signal intensities received by the transmitters 2 attached to those wheels 6*a* and 6*d* is smaller, thus sometimes making it impossible to distinguish a reply from the transmitter 2 at one wheel 6*a* (6*d*) from a reply from the transmitter 2 at the other wheel 6*d* (6*a*).

Such a difficulty can be overcome by shifting the second triggering device 5*b* to the wheel side which is the same right or left side of the vehicle body as that on which the first triggering device 5*a* is located. In this arrangement, the triggering signal from the second triggering device 5*a* shows the highest intensity at the transmitter 2 attached to the rear left wheel 6*d*, thereby differentiating in the reception intensity of the triggering signal the transmitter 2 at the rear left wheel 6 from the transmitters 6 at both the rear right wheel 6*c* and the front left wheel 6*b*.

Concerning the triggering signal from the first triggering device 5*a*, there is a case where it cannot be determined which one of the transmitters at the front right wheel 6*a* and the rear left wheel 6*d* has sent out which one of the frames of data showing the second and third highest reception intensities of the triggering signal. Even in this case, the second triggering device 5*b* encounters this difficulty. That is, using the triggering signal from the second triggering device 5*b*, it is possible to determine that the transmitter 2 attached to the rear left wheel 6*d* has sent out a frame of data including the data showing the highest reception intensity, thus being possible to determine the transmitter 2 attached to the front right wheel 6*a*. The opposite logical estimation also results in determining that the transmitter 2 is attached to the front right wheel 6*a*.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. An apparatus for detecting positions of a plurality of wheels of a vehicle, comprising:

transmitters attached respectively to the plurality of wheels, each of the transmitters comprising a receiving antenna, a transmitting antenna, a receiving unit receiving a triggering signal via the receiving antenna, a first processing unit receiving the triggering signal received by the receiving unit, calculating a reception intensity of the triggering signal, and storing data indicative of the reception intensity into a frame to be transmitted, and a transmitting unit transmitting the frame processed by the first processing unit via the transmitting antenna;

a triggering device disposed in a body of the vehicle and formed to output the triggering signal toward the transmitters attached to the plurality of wheels, the triggering device being positioned nearest to a specified wheel among the plurality of wheels to which the triggering signal is outputted, the specified wheel being influenced most heavily by noise generated in the vehicle; and a receiver disposed to the body and formed to comprise a receiving unit receiving the frame transmitted from the transmitters and a second processing unit processing the received frame to read out the data indicative of the reception intensity from the frame and use the read-out data to detect the positions of the wheels by determining which transmitter is attached to which wheel.

2. The apparatus of claim 1, wherein the plurality of wheels are four in number consisting of two wheels composed of front right and left wheels and two wheels composed of rear right and left wheels, the triggering device comprises a first triggering device to output the triggering signal to the front right and left wheels and a second triggering device to output the triggering signal to the rear right and left wheels, and either the first or second triggering device is disposed at a wheel house of the specified wheel, and the remaining one of the first or the second triggering device is disposed at one wheel of either the front right and left wheels or the rear right and left wheels other than the right and left wheels including the specified wheel, which one wheel agrees with the specified wheel as to which of the right and left wheel position is subject to disposal of both the one wheel and the specified wheel.

3. The apparatus of claim 2, wherein the vehicle includes a noise source generating the noise of which frequency band overlaps, at least, in part, with a frequency band of the triggering signal.

4. The apparatus of claim 3, wherein a noise source generating the noise is previously identified based on a characteristic showing a relationship between a noise frequency and a noise intensity, the relationship providing frequency/intensity ranges to allow and not to allow the triggering signal to be received, the noise being identified as being not received on the characteristic.

5. The apparatus of claim 4, wherein the noise has a frequency of which difference from the frequency of the triggering signal is less than 10 kHz.

6. The apparatus of claim 5, wherein the noise has a frequency which is within a range of 100-200 kHz.

7. The apparatus of claim 1, wherein the vehicle includes a noise source generating the noise of which frequency band overlaps, at least, in part, with a frequency band of the triggering signal.

8. The apparatus of claim 7, wherein a noise source generating the noise is previously identified based on a characteristic showing a relationship between a noise frequency and a noise intensity, the relationship providing frequency/intensity ranges to allow and not to allow the triggering signal to be received, the noise being identified as being not received on the characteristic.

9. The apparatus of claim 8, wherein the noise has a frequency of which difference from the frequency of the triggering signal is less than 10 kHz.

10. The apparatus of claim 9, wherein the noise has a frequency which is within a range of 100-200 kHz.

11. The apparatus of claim 1, wherein a noise source generating the noise is previously identified based on a characteristic showing a relationship between a noise frequency and a noise intensity, the relationship providing frequency/intensity ranges to allow and not to allow the triggering signal to be received, the noise being identified as being not received on the characteristic.

12. The apparatus of claim 11, wherein the noise has a frequency of which difference from the frequency of the triggering signal is less than 10 kHz.

13. The apparatus of claim 12, wherein the noise has a frequency which is within a range of 100-200 kHz.

14. The apparatus of claim 1, wherein the noise has a frequency which is within a range of 100-200 kHz.

15. An apparatus for detecting inflation pressure of tires provided at a plurality of wheels of a vehicle, comprising
transmitters attached respectively to the plurality of wheels, each of the transmitters comprising
a sensing unit that senses inflation pressure of each tire and outputting a sensing signal indicative of the inflation pressure,
a receiving antenna,
a transmitting antenna,
a receiving unit that receives a triggering signal via the receiving antenna,
a first processing unit that receives the triggering signal received by the receiving unit, calculates a reception intensity of the triggering signal, processing the sensing signal indicative of the inflation pressure, and stores both data indicative of the reception intensity and the processed sensing signal into a frame to be transmitted, and
a transmitting unit that transmits the frame processed by the first processing unit via the transmitting antenna;
a triggering device disposed in a body of the vehicle and formed to output the triggering signal toward the transmitters attached to the plurality of wheels, the triggering device being positioned nearest to a specified wheel among the plurality of wheels to which the triggering signal is outputted, the specified wheel being influenced most heavily by noise generated in the vehicle; and
a receiver disposed to the body and formed to comprise
a receiving unit that receives the frame transmitted from the transmitters,
a second processing unit that processes the received frame to read out the data indicative of the reception intensity from the frame and use the read-out data to detect positions of the wheels by determining which transmitter is attached to which wheel, and
a calculating unit that calculates the inflation pressure of each tire based on the sensing signal stored in the frame.

16. A method of manufacturing an apparatus detecting positions of a plurality to wheels of a vehicle, the apparatus comprising:
a triggering device formed to output a triggering signal and disposed in a body of the vehicle;
transmitters attached respectively to the plurality of wheels, each of the transmitters including a member calculating a reception intensity of a triggering signal given to each transmitter and storing data indicative of the reception intensity into a frame to be transmitted; and
a receiver disposed to the body and formed to include a member reading out the data indicative of the reception intensity from the frame received from each transmitter and using the read-out data to detect the positions of the wheels by determining which transmitter is attached to which wheel,
the manufacturing method comprising steps of:
measuring an intensity of noise at each of the plurality of wheels; and
disposing the triggering device nearer to a specified one of the plurality of wheels than the other wheels, the specified wheel providing the highest intensity of the noise.

* * * * *